April 29, 1941. L. SAIVES 2,240,022
FRAMEWORK FOR VEHICLES
Filed Feb. 3, 1939 3 Sheets-Sheet 2
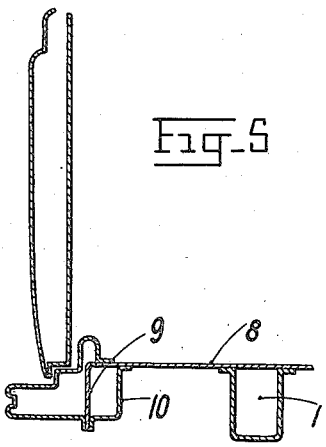
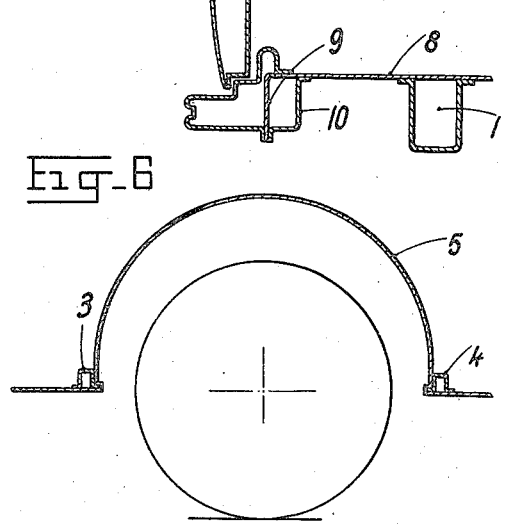
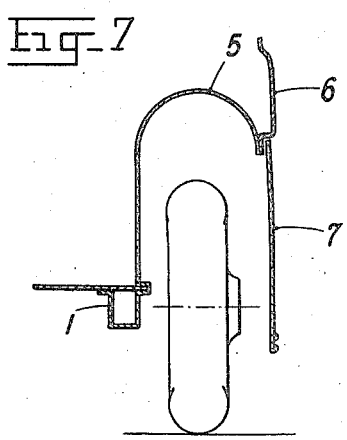
L. Saives
Inventor
By: Glascock Downing & Seebold
Attys.

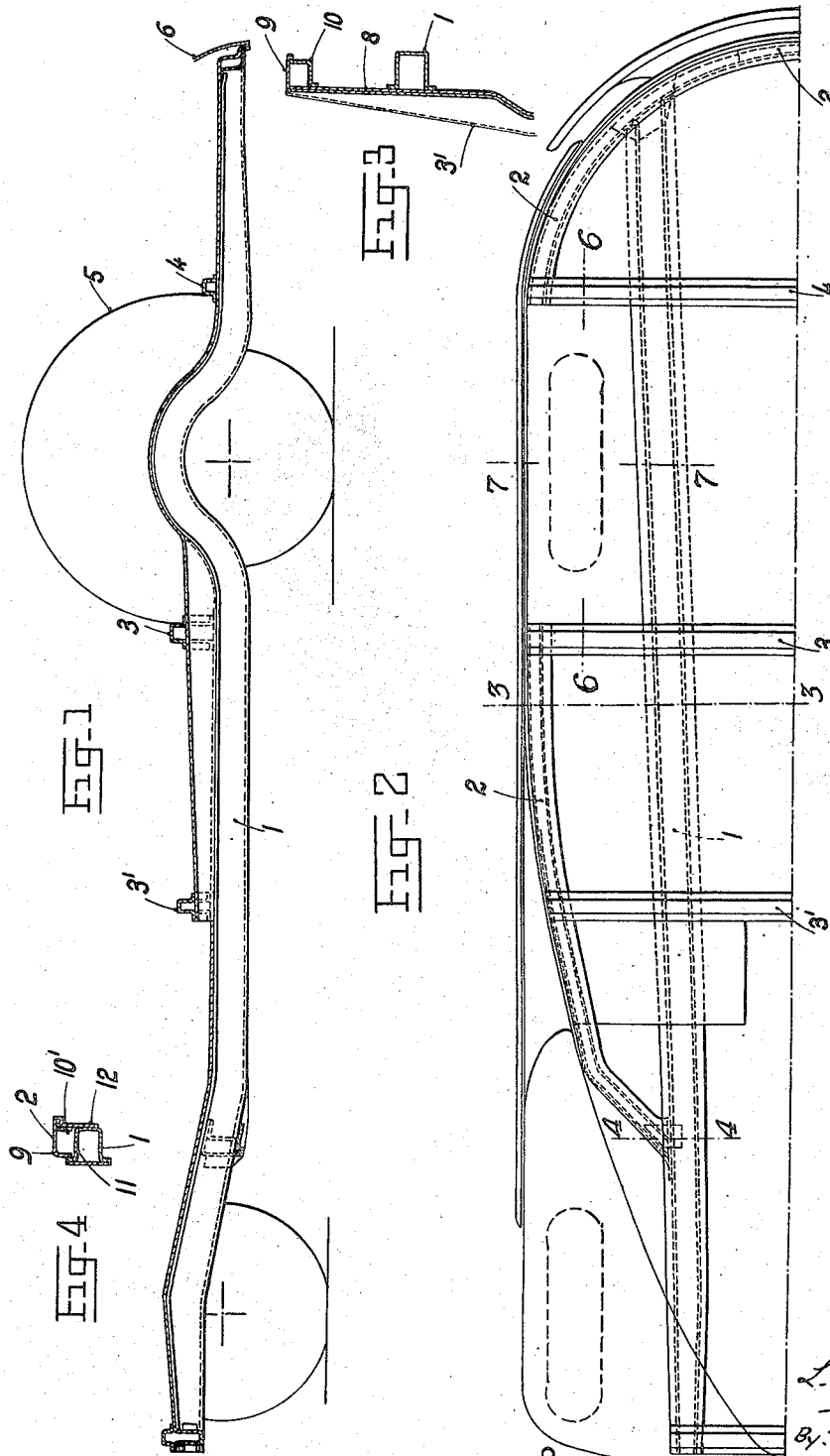

April 29, 1941.   L. SAIVES   2,240,022
FRAMEWORK FOR VEHICLES
Filed Feb. 3, 1939   3 Sheets-Sheet 3

L. Saives
Inventor
By Glascock Downing & Seebold
Attys.

Patented Apr. 29, 1941

2,240,022

UNITED STATES PATENT OFFICE 2,240,022

FRAMEWORK FOR VEHICLES

Léon Saives, Billancourt, France, assignor to Louis Renault, Billancourt, Seine, France Application February 3, 1939, Serial No. 254,478
In France March 25, 1938

3 Claims. (Cl. 280—106)

The present invention relates to frame work for vehicles, and chiefly for motor vehicles, and it is characterized by the special arrangement and assembling of secondary side-beams which are placed outside of the main side-beams, and of concave members forming mudguards and mounted over the rear wheels, said concave members being permanently secured to the main side-beams and to two cross-pieces situated on either side of the same, in such way as to render the vehicle frame rigid and to provide for the direct securing of the vehicle body to the said concave members. The flooring, which is directly welded to the open U-shaped part of the side-beams, forms part of the secondary side-beams, the other part consisting of a section iron member which is secured in such way as to close the box part.

The invention further relates to a constructional form of the concave members forming mudguards and permanently secured to the main side-beams and to the two cross-pieces situated on either side of the same.

In this new construction, the peripheral wall of the concave member consists of relatively thick sheet metal, whose outer edges are secured to the cross-pieces as above stated, while thick sheet-metal pieces having the radial position and a suitable section are secured at their upper and lower ends to the said concave member and to the flange of the respective side-beam. The open part of the concave member, on the inner side, is closed by a thin piece of sheet-metal which is suitably secured at its lower edge to the right-angled edge of the flooring, as will be further set forth.

The aforesaid structure has a great rigidity and it can be more readily constructed, as the said mudguard can be simply stamped out of a piece of sheet-metal.

The said invention further relates to certain accessory arrangement which will be described hereafter in detail.

The invention will be particularly described with reference to the accompanying drawings.

Fig. 1 is a section on the axis of the vehicle frame in conformity to the invention.

Fig. 2 is a half plan view of the same.

Fig. 3 is a section on the line 3—3 of Fig. 2.

Fig. 4 is a section on the line 4—4 of Fig. 2, showing the assembling of the secondary side-beam and the main side-beam.

Fig. 5 is a cross-section of the vehicle frame adjacent a door of the vehicle body.

Fig. 6 is a section on the line 6—6 of Fig. 2.

Fig. 7 is a section on the line 7—7 of Fig. 2, showing the assembling of the secondary side-beam and the main side-beam.

Figure 8:
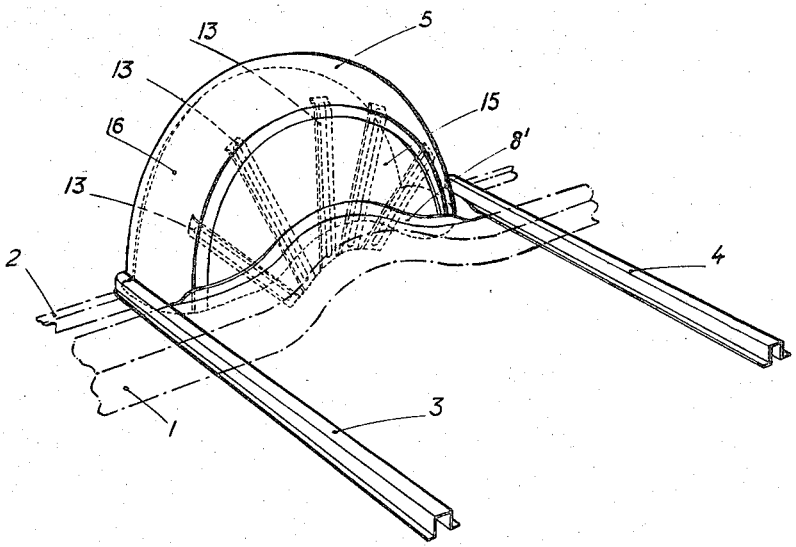
Fig. 8 is a perspective view of the concave member and of the adjacent parts of the vehicle frame, according to another constructional form.

With reference to the drawings (Fig. 1), it will be observed that the vehicle frame essentially consists of the main side-beams 1 and of secondary outer side-beams 2 which surround the vehicle frame and extend in the rear of this latter, being then assembled with the main side-beams 1 at the front part of these latter. The said smaller side-beams 2 are cut off at a point adjacent the rear wheels and between two cross-pieces 3 and 4 which are placed on either side of the wheels and make connection between the main side-beams and the secondary side-beams. The number of cross-pieces of the vehicle frame which are used in addition to these two special cross-pieces, is subject to choice.

Concave members 5 consisting of sheet metal of suitable thickness, which may be ribbed, are mounted above the rear wheels, and serve as the inner part of the mudguard. The said concave members are welded or otherwise secured to the cross-pieces 3 and 4 and also to the main side-beams 1. Thus the said concave members form part of the vehicle frame, and cooperate for a good strength and rigidity for the said frame. The vehicle body 6 is directly secured, by welding or otherwise, to the main side-beams of the frame and also to the concave members 5 (Figs. 1 and 7). Side-plates 7 may be provided in the known manner in order to cover the opening in the frame which serves for the mounting of the rear wheels.

Fig. 3, which is a cross-section of the frame, particularly shows the form which is given to the main and the secondary side-beams in cross-section, and also the method of securing the sheet-iron flooring to the said main and secondary beams. The main side-beams consist of channel iron bars which are open at the top. The sheet-iron flooring 8 is welded to the flanged top part of the main side-beams, and is bent at right-angles at 9, in order to form a part of the outer secondary beam. This latter is completed by a stamped piece 10 having the section shown in Fig. 3, and its edges are welded to the flooring 8 and to the vertical part 9. This affords a box cross-section for the secondary beam.

The cross-pieces of the vehicle frame are secured to the flooring 8. In Fig. 3, one of the cross-pieces is shown in $3^1$. Fig. 5 also shows, in cross-section, the construction of the main and secondary side-beams, as well as the flooring. The assembling of the beams 1 and 2 is shown in Fig. 4. The secondary beam is bent at an angle in order to fit upon the main beam, and when these two parts come together, the part 9 comes below the upper horizontal part of the outer portion 11 of the beam 1. The stamped member 10 of the secondary beam is simplified, and comprises a part 10¹ which is welded to the member 9 of the secondary beam; a gusset 12 is welded to the bottom of the beam 1 and also to the member 10 of the secondary beam.

This method for the construction of vehicle frames by means of main and secondary side-beams combined with the sheet-metal flooring and with concave members surrounding the wheels and forming part of the vehicle frame, will afford a very strong and rigid frame. The vehicle body is secured to the secondary beams and also to the concave members surrounding the wheels. This form of construction is chiefly, although not exclusively, utilized for vehicles with wide bodies, without footboards.

The false frame (secondary beams) will support the shock-protectors, at the sides and rear, either directly or through elastic members, such as springs or yielding material.

Figure 9:
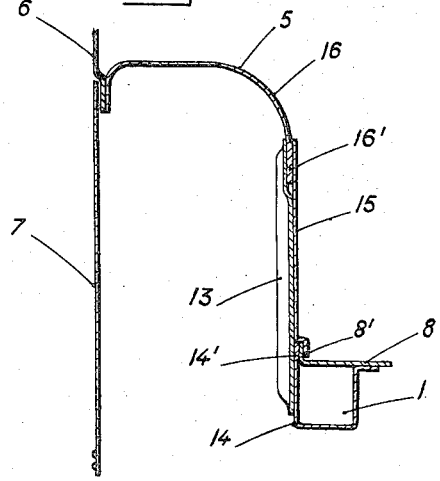
Fig. 9 is a transverse section through the concave member shown in Figure 8.

In the construction shown in Figs. 8 and 9, the concave member 5 does not consist of a single piece which is stamped together with its lower part, as above described, but it has the form of a simple guard 16, consisting of relatively thick sheet metal, and its ends are secured by any suitable means to the cross-pieces 3 and 4. The guard 16 is secured to the beam 1 by members 13 consisting of thick sheet metal of suitable cross-section, which preferably comprise a central rib providing a certain rigidity. The members 13 are attached, for instance by autogenous welding, at one end to the inner edge 16¹ of the guard 16, and at the other end to the extension 14¹ of the flange 14 of the beam 1. To this extension 14¹ is applied the right-angled edge 8¹ of the flooring 8 located between the cross-pieces 3 and 4. The open part of the guard 16 situated on the inner side is closed by a thin sheet-metal plate 15 which is secured by any suitable means to the guard 16, and also to the members 13 and to the edge 8¹ of the flooring 8, or to either of these parts. The open part of the said guard on the outer side can be closed in the known manner by a removable plate 7. The entire concave device thus constructed is quite rigid, and it is superior to the aforesaid arrangement, as it can be more readily constructed, for the guard can be stamped from a sheet-metal band.

I claim:

1. A vehicle frame comprising flanged U-shaped main side beams, box-shaped external secondary side beams, connected with the main side beams at its front part and surrounding the vehicle frame at the rear, a concave member forming part of a mud guard on each side and secured to the main side beams, cross-pieces arranged in front of and behind the rear wheels and connecting said main beams with the secondary beams, the secondary beams being interrupted by the concave members, a horizontal flooring having the ends bent at right angles, the flanges of the main side beams being welded to the flooring to present a box shaped formation and the box-shaped secondary beams being constituted partly by section iron members and partly by the flooring and its bent ends welded to said section members.

2. A vehicle frame comprising flanged U-shaped main side beams, box-shaped external secondary side beams connected with the main side beams at the front part and surrounding the vehicle frame at the rear, a concave member forming part of a mud guard on each side and secured to the main side beams, cross-pieces arranged in front of and behind the rear wheels and connecting said main beams with the secondary beams, the secondary beams being interrupted by the concave members, the inner vertical part of box-shaped secondary beam being removed at the point of connection between said beams and the remaining portion thereof being welded to the main beam, and a reinforcing gusset welded to lower parts of the main and secondary beams at said point of connection.

3. A vehicle frame comprising flanged U-shaped main side beams, box-shaped external secondary side beams connected with the main side beams at the front part and surrounding the vehicle frame at the rear, a concave member forming part of a mud guard on each side and secured to the main side beams, cross-pieces arranged in front of and behind the rear wheels and connecting said main beams with the secondary beams, the secondary beams being interrupted by the concave members, the ends of said concave member being secured to the cross-pieces and the sides thereof being open, a radial member connected at one end with the concave member and at the other end with the flange of the main side beam, and a thin piece of sheet metal secured in the inner open side of the concave member.

LÉON SAIVES.